United States Patent [19]

Hilliard, Jr.

[11] Patent Number: 5,187,690
[45] Date of Patent: Feb. 16, 1993

[54] ACOUSTIC TRANSDUCER SYSTEM

[75] Inventor: Edward J. Hilliard, Jr., Middletown, R.I.

[73] Assignee: The United States of America as represented by the Secretary of the Navy, Washington, D.C.

[21] Appl. No.: 892,063

[22] Filed: May 28, 1992

[51] Int. Cl.⁵ .............................................. H04B 11/00
[52] U.S. Cl. ...................................... 367/131; 367/135
[58] Field of Search ................. 367/135, 169, 170, 131

[56] References Cited

U.S. PATENT DOCUMENTS 2,965,877 12/1960 Stein et al. .......................... 367/170
4,497,046 1/1985 Savage ................................ 367/170

Primary Examiner—Daniel T. Pihulic
Attorney, Agent, or Firm—Michael J. McGowan; Prithvi C. Lall; Michael F. Oglo

[57] ABSTRACT

An acoustic transducer system employs a seawater return cable as a receiver element. The cable is either open ended or short circuited with the seawater. A carrier frequency is applied at one end of the cable. Acoustic pressure waves impinging the cable change the characteristic input impedance of the cable. The changes in the impedance amplitude and phase angle are processed to derive information descriptive of the acoustic source.

4 Claims, 2 Drawing Sheets

ACOUSTIC TRANSDUCER SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to acoustic detection systems for detecting acoustic signals. More particularly, the present invention relates to acoustic systems which are employed in undersea applications for detecting acoustic pressure pulses from various underwater sources.

(2) Description of the Prior Art

Conventional acoustic detection systems to which this invention relates employ linear acoustic receiving arrays of discrete acoustic sensors or hydrophone elements, which are spaced at intervals along the array. In some systems a large number of hydrophones may be employed and electrically connected through a platform where the various signal processing and output equipment are located. Conventional sonar systems employ magneto-strictive or ceramic elements which are relatively expensive and cumbersome. Such conventional acoustic systems may employ acoustic line array configurations which are either towed behind a vessel or disposed in a fixed relationship.

In U.S. Pat. No. 4,176,339 entitled "Propagation Sampled Acoustic Line Array", an acoustic line array includes a co-axial cable having a central conductor surrounded by a flexible material of low-electrical conductivity. The flexible material is surrounded by a conducting material protected by an external shield. A characteristic impedance of the cable is sensitive to pressure variations in the surrounding medium due to traveling acoustic pressure waves from an acoustic source. The acoustic source is detected by use of reflectometry techniques and by variations in the impedance of the array. In one embodiment, the line array employs discrete sensors which are located at suitable intervals along the array. A sample pulse generator is coupled to one end of the cable. The cable terminates in characteristic impedance. It is desirable to use this principle for an acoustic transducer system.

SUMMARY OF THE INVENTION

Briefly stated, the invention in a preferred form is an acoustic transducer system employing a seawater return cable which functions as a single acoustic receiver element. A continuous wave generator is coupled to one end of the cable. The terminal end of the cable is either open circuited or short circuited. In one embodiment, a transformer is connected in a circuit with the carrier signal generator. Acoustic pressure pulses impinging the cable produce changes in the amplitude and the phase angle of the input impedance of the carrier wave. Changes in the amplitude of the voltage at the primary winding of the transformer are detected. The amplifier amplifies a signal from the detector to provide an electrical output which is indicative of an acoustic signal impinging the cable. In a second embodiment, the acoustic signal impinging the cable is detected by changes in the frequency of an oscillator.

An object of the invention is to provide a new and improved acoustic transducer system for detecting undersea acoustic signals.

Another object of the invention is to provide a new and improved acoustic transducer system which is relatively inexpensive and is highly responsive to undersea acoustic signals.

A further object of the invention is to provide a new and improved acoustic transducer system which is relatively compact and may be relatively easily tuned to provide an acoustic detector.

Other objects and advantages of the invention will become apparent from the drawings and the specification.

DETAILED DESCRIPTION OF THE PREFERRED EMBODIMENT

Figure 1:
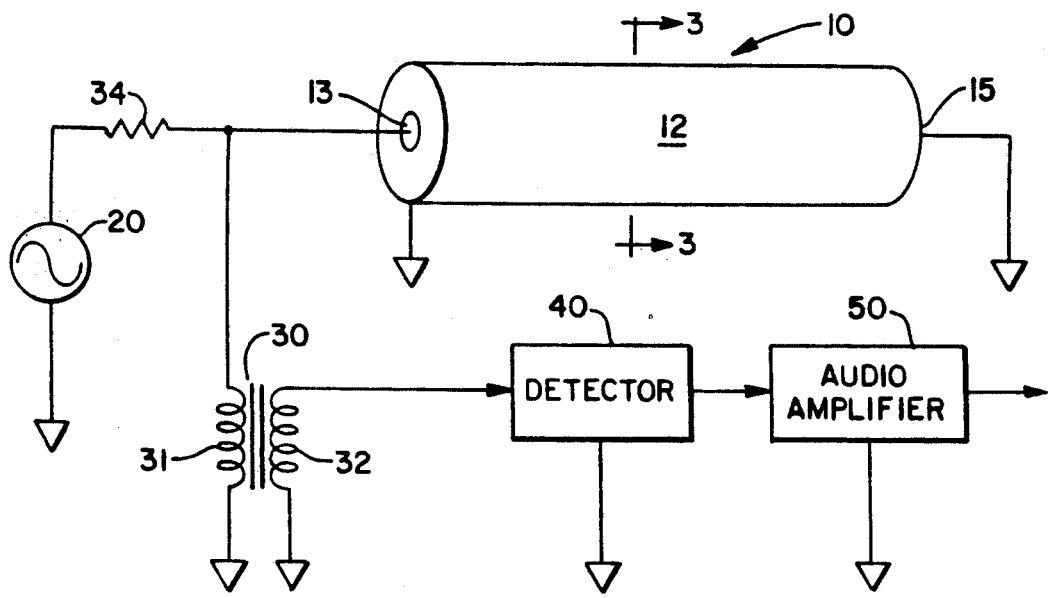
FIG. 1 is a schematic block diagram of an acoustic transducer system in accordance with the present invention.

With reference to the drawings wherein like numerals represent like parts throughout the Figures, an acoustic transducer system in accordance with the present invention is generally designated by the numeral 10. Acoustic transducer system 10 in a preferred application is employed to convert acoustic signals in seawater to electrical signals. The electrical signals are processed by various conventional means to identify and provide various information concerning the source of the signal.

The acoustic transducer system 10 employs a seawater return co-axial cable 12 of preestablished length. The cable 12 essentially functions as the receiver unit. The co-axial cable includes an inner conductor 14 which is surrounded by a flexible material 16 low electrical conductivity. The cable 12 includes an input or proximal end 13 and a terminal end 15. The terminal end 15 of the cable is either short circuited or open circuited with the surrounding seawater. A carrier signal generator 20 is electrically coupled to the input end 13 of the cable for applying a carrier wave of preestablished frequency and amplitude to the cable. A transformer 30 is connected in a circuit with the generator 20, resistor 34 and the cable 12. A voltage amplitude detector 40 is electrically connected with the secondary winding 32 of the transformer for detecting changes in the amplitude of the voltage at the primary winding 31. An acoustic amplifier 50 amplifies the output signal from the detector 40 to provide an electrical output signal suitable for processing to provide a display characteristic of the detected acoustic signal.

An acoustic signal from the acoustic source produces an acoustic pressure wave which traverses the seawater and impinges the cable 12. The outer diameter of the cable changes in response to the impinging pressure wave to thereby change the characteristic impedance and the attenuation and phase factors of the cable. The change in the electrical characteristics result in a change to both the amplitude and the phase angle of the input impedance. Consequently, the amplitude of the carrier frequency which appears at the primary winding 31 of the transformer 30 changes as more or less of the carrier voltage is dropped across the resistor 34.

Mathematical relationships of the input impedance for the coaxial cable 12 comprising conductor 14 and dielectric material 16 in seawater are set forth below:

$$R = \frac{\omega \mu}{8} + \frac{1}{\pi a^2 \sigma_1} \text{ ohms/meter} \quad (1)$$

$$L = \frac{\mu}{2\pi} + \frac{.794 \delta_3}{a} \text{ henries/meter} \quad (2)$$

$$C = \frac{2\pi \epsilon_2}{\ln \frac{A}{a}} \text{ farads/meter} \quad (3)$$

$$G = \frac{2\pi \sigma_2}{\ln \frac{A}{a}} \text{ mho/meter} \quad (4)$$

where $$\delta_3 = \sqrt{\frac{2}{\pi \mu \sigma_3}} \quad (5)$$

Subscript 1 indicates the conductor 14
Subscript 2 indicates the dielectric 16
Subscript 3 indicates the sea water
$\omega = 2\pi f$
$\mu$ = permeability = $4\pi \times 10^{-7}$ hy/meter
$\sigma$ = conductivity in mho/meter
  for copper $\sigma_1 = 0.58 \times 10^8$ mho/meter
  for polyethylene $\sigma_2 = 0.628 \times 10^{-10}$ mho/meter
  for seawater $\sigma_3 = 3.61$ mho/meter
$\epsilon$ = permitivity in farads/meter
  for polyethylene $\epsilon_2 = (2.26)(8.85 \times 10^{-12})$ farads/meter
A = radius of dielectric material 16 in meters
a = radius of conductor 14 in meters From the values for R, L, G, and C the following are calculated:

$$Z_0 = \sqrt{\frac{R + j\omega L}{G + j\omega C}} = |Z_0| < \phi \quad (6)$$

$$\alpha + j\beta = \sqrt{(R + j\omega L)(G + j\omega C)} \quad (7)$$

where
  $Z_0$ is in ohms
  $\phi$ is in degrees
  $\alpha$ is in nepers/meter
  $\beta$ is in radians/meter The input impedance of a shorted line is determined from:

$$Z_{in} = Z_0 \tanh(n \alpha + jn \beta)$$

where n is line length in meters.

Figure 4:
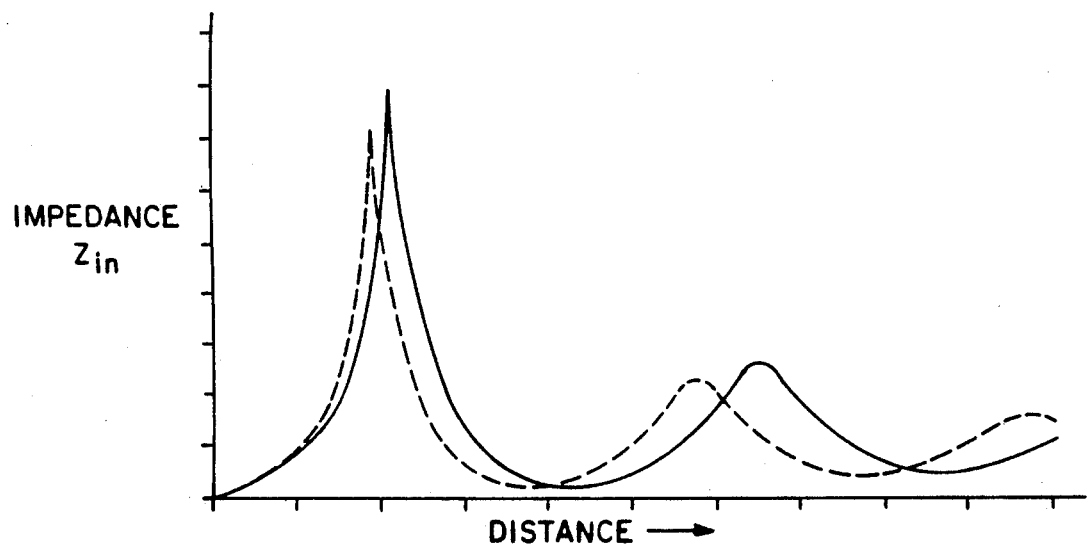
FIG. 4 is a graphical representation illustrating the relationship between the impedance amplitude and the distance from the terminal end of a cable for two different radii wherein the radial difference is caused by the application of acoustic pressure to the cable.

The change in the input impedance at 13 which results from a change in the outer diameter of the cable 12 is graphically illustrated in FIG. 4. The amplitude of the impedance is illustrated in relation to the distance from the terminal end of the cable. The solid line represents a cable of radius (8 mm) and the broken line a radius (6 mm). The frequency is 1.25 megahertz (MHz). The abscissa scale is graduated in 10 meter units. The ordinate scale is graduated in 100 ohm units. For the illustrated example, the difference in impedance that occurs at approximately 70 meters from the end of the cable is approximately 100 ohms for a change in radius of 2 mm.

Figure 2:
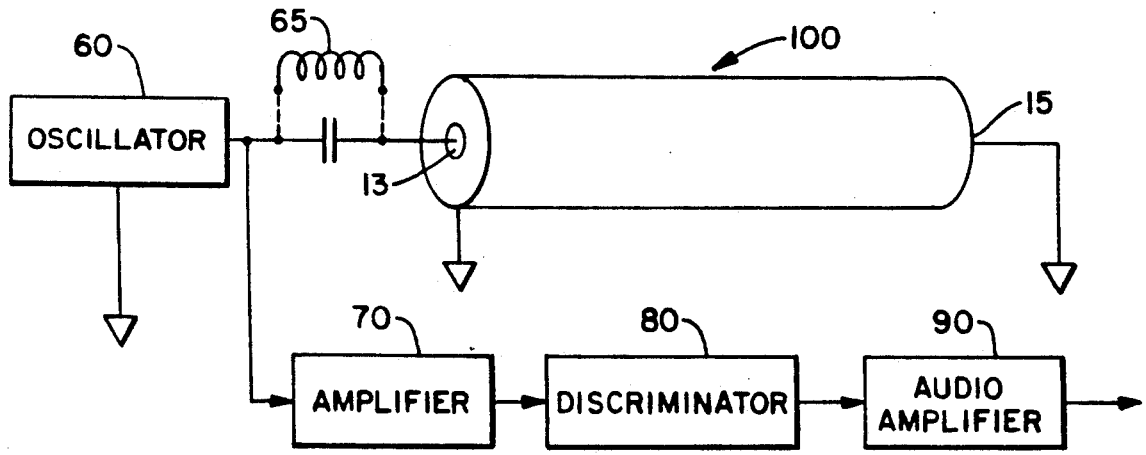
FIG. 2 is a schematic block diagram of an alternate embodiment of an acoustic transducer system in accordance with the present invention.
Figure 3:
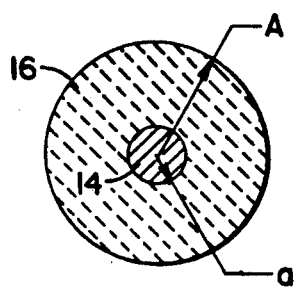
FIG. 3 is a cross-sectional view of a seawater return cable of FIG. 1 taken along the line 3—3 thereof.
Figure 5:
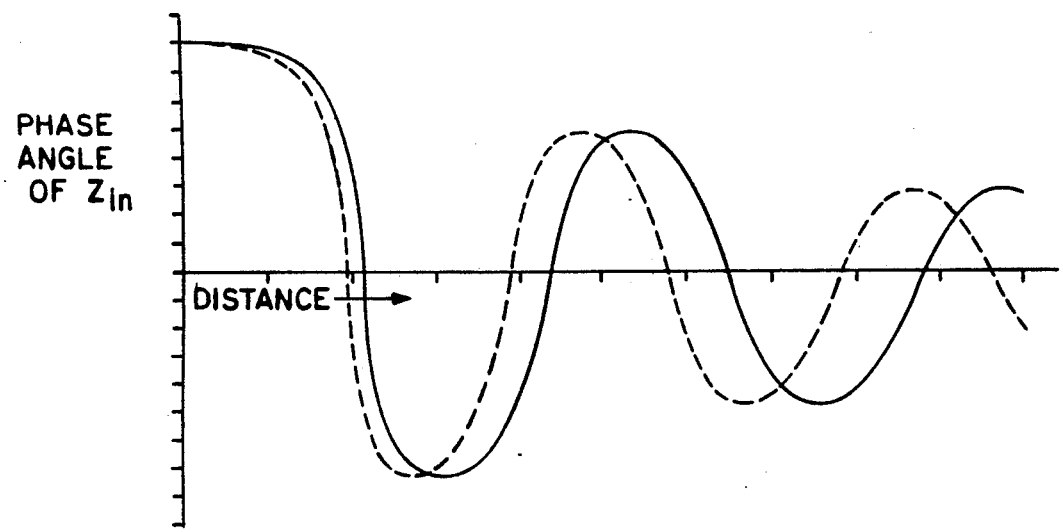
FIG. 5 is a graphical representation illustrating the relationship between the impedance phase angle and the distance from the terminal end of a cable for two different radii wherein the radial difference is caused by the application of acoustic pressure to the cable.

With reference to FIG. 2, an alternate embodiment of an acoustic transducer system designated generally by the number 100 employs an oscillator 60 which is connected in circuitry with one of the elements 65 and the input of the cable 12. The output from the oscillator 60 is applied to an amplifier 70, a discriminator 80 and an audio amplifier 90. The relationship between the phase angle of the input impedance at 13 with the distance from the terminal cable end 15 resulting from the change in the outer diameter caused by acoustic pressure is illustrated in FIG. 5. The solid line represents a cable radius of (8 mm) and the broken line a radius of (6 mm). The ordinate scale is graduated in 10 degree units. The abscissa scale is graduated in 10 meter units. For the illustrated example, the difference in angle that occurs at approximately 40 meters from the end of the cable is approximately 55 degrees for a change in radius of 2 mm.

As shown in FIG. 2, one of the elements 65 is inserted to create a series resonant circuit with the input impedance of the cable 12. This resonant circuit is the frequency determining network for the oscillator 60. As the acoustic signal changes the outer radius of the cable 12, the change in the angle of the input impedance at 13 shifts the frequency of the oscillator 60.

The acoustic transducer systems 10 and 100 may have applicability in connection with use as a sonar detector, a depth sensing device or use as a cavitation sensor upon positioning the systems on the hull of a vessel. A particular advantage of the invention is the use of a conventional inexpensive seawater return cable 12 as the receiver element. All of the components of the system are relatively efficient, inexpensive and are easily adjustable for providing an initial tuning of the system.

The acoustic detection characteristics of the system are initially established by cutting the cable 12 at the desired length and implementing either a shorted or an open end termination. The carrier frequency of the generator is then adjusted in accordance with the preestablished length of the cable 12 to optimize the amplitude difference at the selected distance from the terminal end 15. The depth bias may be eliminated by appropriate adjustment of the carrier frequency. The changes in the impedance amplitude and the impedance phase are detected, and empirical data is employed to derive information concerning the acoustic wave.

It is to be understood that various changes in details, materials, steps and arrangements of parts, which have been herein described and illustrated in order to explain the nature of the invention, may be made by those skilled in the art within the principle and scope of the invention as expressed in the appended claims.

What is claimed is:

1. An acoustic transducer system for detecting an acoustic source in seawater comprising:

a seawater return cable having a proximal end and a terminal end and a conductor surrounded by a coaxial dielectric material;

carrier signal generator means for applying a continuous carrier wave signal to said proximal end;

a transformer means in electrical communication with said generator means; and input impedance detector means for detecting changes in voltage amplitude of said transformer means and also for detecting a change in input impedance of the cable to said carrier wave in response to an acoustic pressure wave impinging said cable and producing an electrical output signal indicative of the pressure wave.

2. The acoustic transducer system of claim 1 further comprising an oscillator in electrical communication with said detector means which further comprises means for detecting changes in the frequency of said oscillator.

3. An acoustic transducer system for detecting an acoustic source in seawater comprising:

a seawater return coaxial cable having a proximal end and a terminal end;

carrier signal generator means for applying a continuous carrier signal to said proximal end;

transformer means in electrical communication with said carrier signal generator means;

detector means for detecting changes in the voltage amplitude of said transformer means; and audio amplifier means responsive to said detector means to provide an output indicative of acoustic pressure from the acoustic source impinging said cable.

4. An acoustic transducer system for detecting an acoustic source in seawater comprising:

a seawater return coaxial cable having a proximal end and a terminal end;

oscillator means in electrical communication with said cable;

discriminator means for detecting changes in the frequency of the oscillator means; and audio amplifier means responsive to said discriminator means to provide a sensory output indicative of acoustic pressure from the acoustic source impinging said cable.

* * * * *